(12) United States Patent
Oh et al.

(10) Patent No.: US 9,042,950 B1
(45) Date of Patent: May 26, 2015

(54) DETACHABLE FRONT FLIP COVER FOR CELL-PHONE CASE

(71) Applicants: Heidi Oh, La Crescenta, CA (US); Kwang J Oh, La Crescenta, CA (US); Loren Oh, Irvine, CA (US); Austin Oh, Azusa, CA (US)

(72) Inventors: Heidi Oh, La Crescenta, CA (US); Kwang J Oh, La Crescenta, CA (US); Loren Oh, Irvine, CA (US); Austin Oh, Azusa, CA (US)

( * ) Notice: Subject to any disclaimer, the term of this patent is extended or adjusted under 35 U.S.C. 154(b) by 58 days.

(21) Appl. No.: 14/084,476

(22) Filed: Nov. 19, 2013

(51) Int. Cl.
*H04M 1/00* (2006.01)
*H04M 1/02* (2006.01)

(52) U.S. Cl.
CPC ........... *H04B 1/3888* (2013.01); *H04M 1/0279* (2013.01)

(58) Field of Classification Search
CPC . H04B 1/3888; H04M 1/0283; H04M 1/0214
USPC ......... 455/575.1, 575.3, 575.8, 347; 206/320; 361/679.55
See application file for complete search history.

(56) References Cited

U.S. PATENT DOCUMENTS

| | | | |
|---|---|---|---|
| 2006/0160586 A1* | 7/2006 | Cheng | 455/575.8 |
| 2010/0048268 A1* | 2/2010 | O'Neill et al. | 455/575.8 |
| 2010/0062816 A1* | 3/2010 | Yu | 455/575.8 |

* cited by examiner

*Primary Examiner* — Tuan Pham
(74) *Attorney, Agent, or Firm* — John K. Park; Park Law Firm

(57) ABSTRACT

The detachable front flip cover comprises a flip cover and a first barrier rod. The flip cover covers a front face of the cell-phone. The flip cover comprises a first side cover portion for covering a first side edge portion, and a front cover portion for covering a front surface portion. The first barrier rod is provided along the first edge of the flip cover, and extends from the first barrier rod, and has a diameter larger than a thickness of the first edge portion of the flip cover, and is configured for being partially fitted into a first groove provided along an edge portion of the main cell-phone case so as to be received and held in place. The first edge portion and the first side cover portion are connected to each other along a line foldably so as to fit a corresponding edge of the cell-phone.

20 Claims, 11 Drawing Sheets

DETACHABLE FRONT FLIP COVER FOR CELL-PHONE CASE

BACKGROUND OF THE INVENTION

The present invention relates to a detachable front flip cover for cell-phone case. More particularly, this invention relates to a detachable front flip cover for cell-phone case, which provides users with more freedom and convenience.

A need for a detachable front flip cover for cell-phone case has been present for a long time considering the expansive demands in the everyday life. This invention is directed to solve these problems and satisfy the long-felt need.

SUMMARY OF THE INVENTION

The present invention contrives to solve the disadvantages of the prior art.

An aspect of the invention provides a detachable front flip cover for main cell-phone case for protecting a cell-phone.

The detachable front flip cover comprises a flip cover and a first barrier rod.

The flip cover is configured for covering a front face of the cell-phone. The flip cover comprises a first edge portion, a first side cover portion configured for covering a first side edge portion of the cell-phone, and a front cover portion configured for covering a front surface portion of the cell-phone.

The first barrier rod is provided along the first edge of the flip cover. The first side cover portion extends from the first barrier rod, and the first barrier rod has a diameter larger than a thickness of the first edge portion of the flip cover, and the first barrier rod is configured for being partially fitted into a first groove provided along an edge portion of the main cell-phone case so as to be received and held in place.

The first edge portion and the first side cover portion are connected to each other along a line foldably so as to fit a corresponding edge of the cell-phone.

The first side cover portion and the front cover portion are connected to each other along a line foldably so as to fit another corresponding edge of the cell-phone.

The first groove may be provided along an inner edge portion of the main cell-phone case so as to be received and held in place between the first groove and a rear surface of the cell-phone with the first side cover portion sticking out from a gap between edges of the main cell-phone case and the cell-phone.

The first groove may have a cross-sectional shape of a partial circle, and an arc portion corresponding to less than 180 degrees of which is opened toward the edge and top of the main cell-phone case such that the first barrier rod is inserted therethrough.

The edge of the main cell-phone case may be tilted by about 45 degrees.

A height of the edge of the main cell-phone case may be lower than a top inner surface of the main cell-phone case so as to make the gap between edges of the main cell-phone case and the cell-phone.

The first groove may be provided along an outer edge portion of the main cell-phone case so as to be received and held in place in the first groove.

The first groove may have a cross-sectional shape of a partial circle, and an arc portion corresponding to less than 180 degrees of which is opened toward a bottom of the main cell-phone case such that the first barrier rod is inserted therethrough, wherein a slit opening formed by the arc portion is smaller than the diameter of the first barrier rod.

At least one of the first barrier rod and the slit opening may be resilient.

The one of the first barrier rod and the slit opening may be made of rubber.

The detachable front flip cover may further comprise a flip cover holder and a second barrier rod.

The flip cover holder is configured for holding the flip cover in front of the cell-phone and comprising a second edge portion, a second side cover portion configured for covering a second side edge portion of the cell-phone, and a holding portion configured for holding the flip cover.

The second barrier rod is provided along the second edge portion, and the second side cover portion extends from the second barrier rod, and the second barrier rod has a diameter larger than a thickness of the second edge portion of the flip cover holder, and the second barrier rod is configured for being partially fitted into a second groove provided along another edge portion of the main cell-phone case so as to be received and held in place.

The second edge portion and the second side cover portion are connected to each other along a line foldably so as to fit still another corresponding edge of the cell-phone.

The second side cover portion and the holding portion are connected to each other along a line foldably so as to fit still another corresponding edge of the cell-phone.

The second groove may be provided along an inner edge portion of the main cell-phone case so as to be received and held in place between the second groove and a rear surface of the cell-phone with the second side cover portion sticking out from a gap between edges of the main cell-phone case and the cell-phone.

The second groove may have a cross-sectional shape of a partial circle, an arc portion corresponding to less than 180 degrees of which is opened toward the edge and top of the main cell-phone case such that the second barrier rod is inserted therethrough.

The edge of the main cell-phone case may be tilted by about 45 degrees.

A height of the edge of the main cell-phone case may be lower than a top inner surface of the main cell-phone case so as to make the gap between edges of the main cell-phone case and the cell-phone.

The flip cover may further comprise a first faster provided at a edge of the front cover portion and the flip cover holder further comprises a second faster.

One of the first and second fasteners may comprise a magnet and the other comprises a ferromagnetic material.

The second groove may be provided along an outer edge portion of the main cell-phone case so as to be received and held in place in the second groove.

The second groove may have a cross-sectional shape of a partial circle, and an arc portion corresponding to less than 180 degrees of which is opened toward a bottom of the main cell-phone case such that the second barrier rod is inserted therethrough, wherein a slit opening formed by the arc portion is smaller than the diameter of the second barrier rod.

At least one of the second barrier rod and the slit opening may be resilient.

The one of the second barrier rod and the slit opening may be made of rubber.

The advantages of the present invention are: (1) the detachable front flip cover for cell-phone case enable a user to apply changes to it; and (2) the detachable front flip cover for cell-phone case according to the invention can be used some functions of the cell-phone without unnecessary further procedures.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

The PCT Application No. PCT/US2013/025172 is incorporated by reference into this disclosure as if fully set forth herein.

FIGS. 1 through 10 show detachable front flip covers 200 for cell-phone case 100 according to embodiments of the invention.

Figure 1:
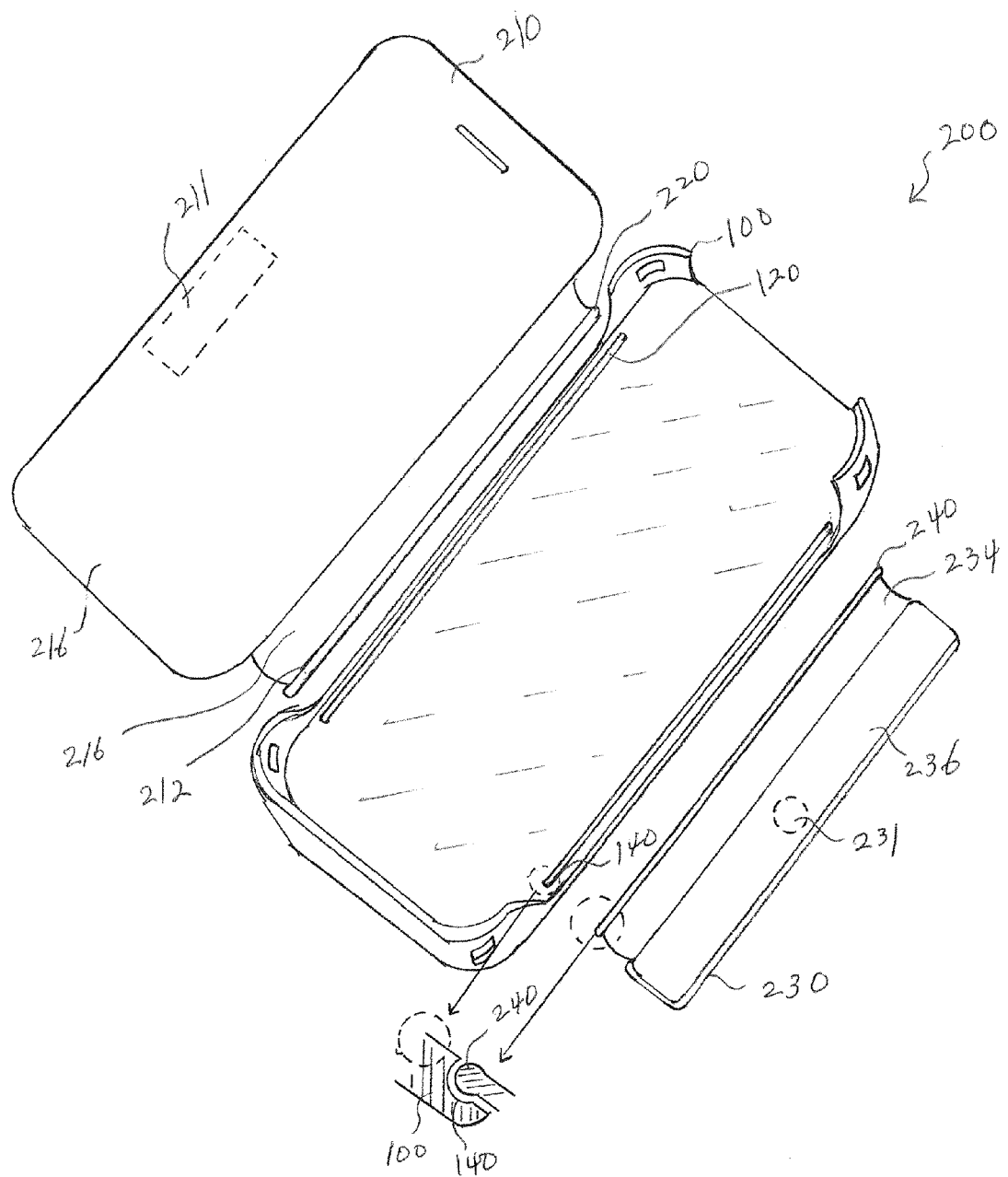
FIG. 1 is a perspective view showing a detachable front flip cover detached from a cell-phone case according to an embodiment of the invention.
Figure 2:
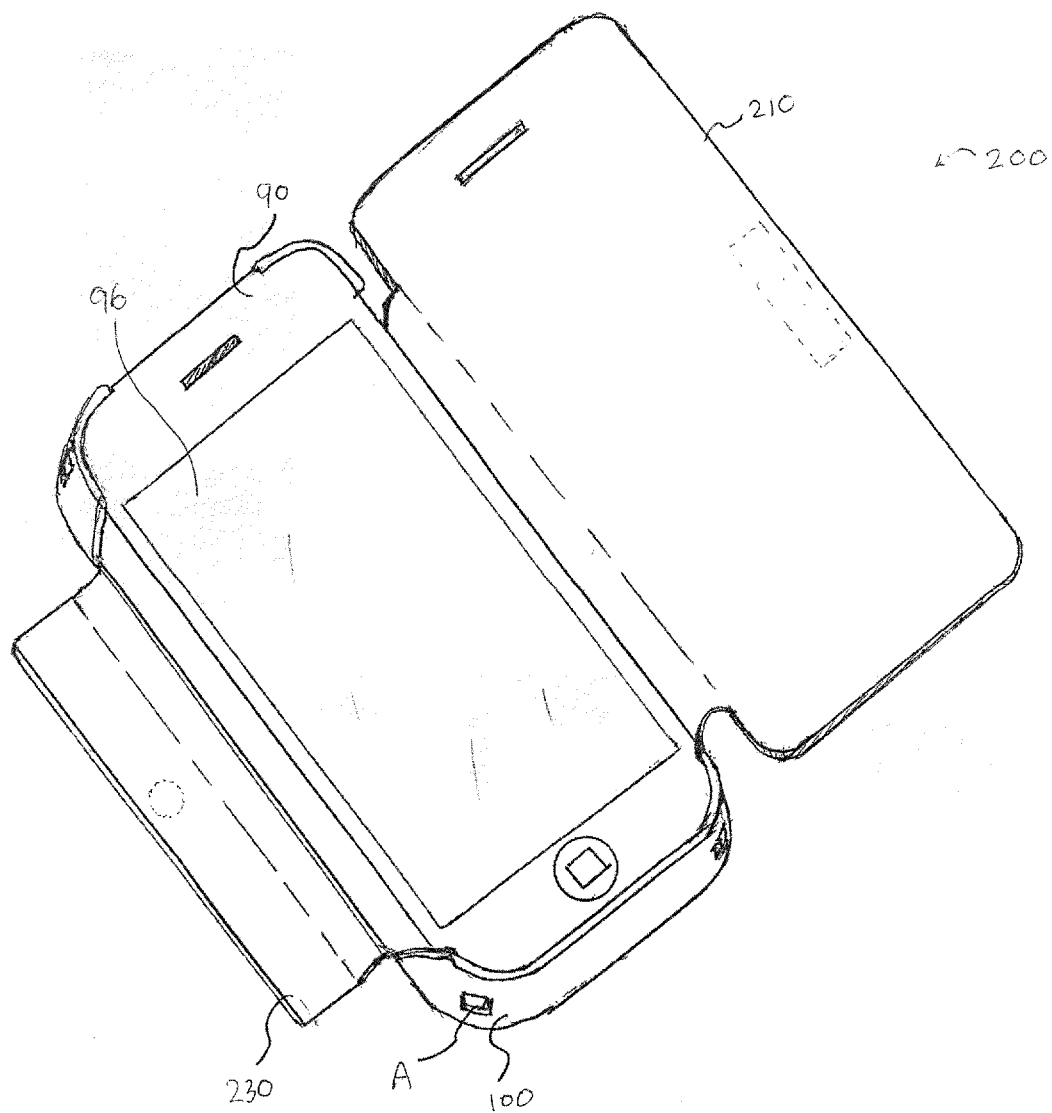
FIG. 2 is another perspective view showing a detachable front flip cover installed in a cell-phone case along with a cell-phone according to an embodiment of the invention.

An aspect of the invention provides a detachable front flip cover 200 for a main cell-phone case 100 especially shown in FIGS. 1 and 2.

The detachable front flip cover 200 comprises a flip cover 210 and a first barrier rod 220.

The flip cover 210 is configured for covering a front face of the cell-phone 90. The flip cover 210 comprises a first edge portion 212, a first side cover portion 214 configured for covering a first side edge portion 92 of the cell-phone 90, and a front cover portion 216 configured for covering a front surface portion 96 of the cell-phone 90.

The first barrier rod 220 is provided along the first edge 212 of the flip cover 210. The first side cover portion 214 extends from the first barrier rod 220, and the first barrier rod 220 has a diameter larger than a thickness of the first edge portion 212 of the flip cover 210, and the first barrier rod 220 is configured for being partially fitted into a first groove 120 provided along an edge portion of the main cell-phone case 100 so as to be received and held in place.

The first edge portion 212 and the first side cover portion 214 are connected to each other along a line foldably so as to fit a corresponding edge of the cell-phone 90 as shown in FIG. 1.

The first side cover portion 214 and the front cover portion 216 are connected to each other along a line foldably so as to fit another corresponding edge of the cell-phone 90 as shown in FIG. 1.

Figure 3:
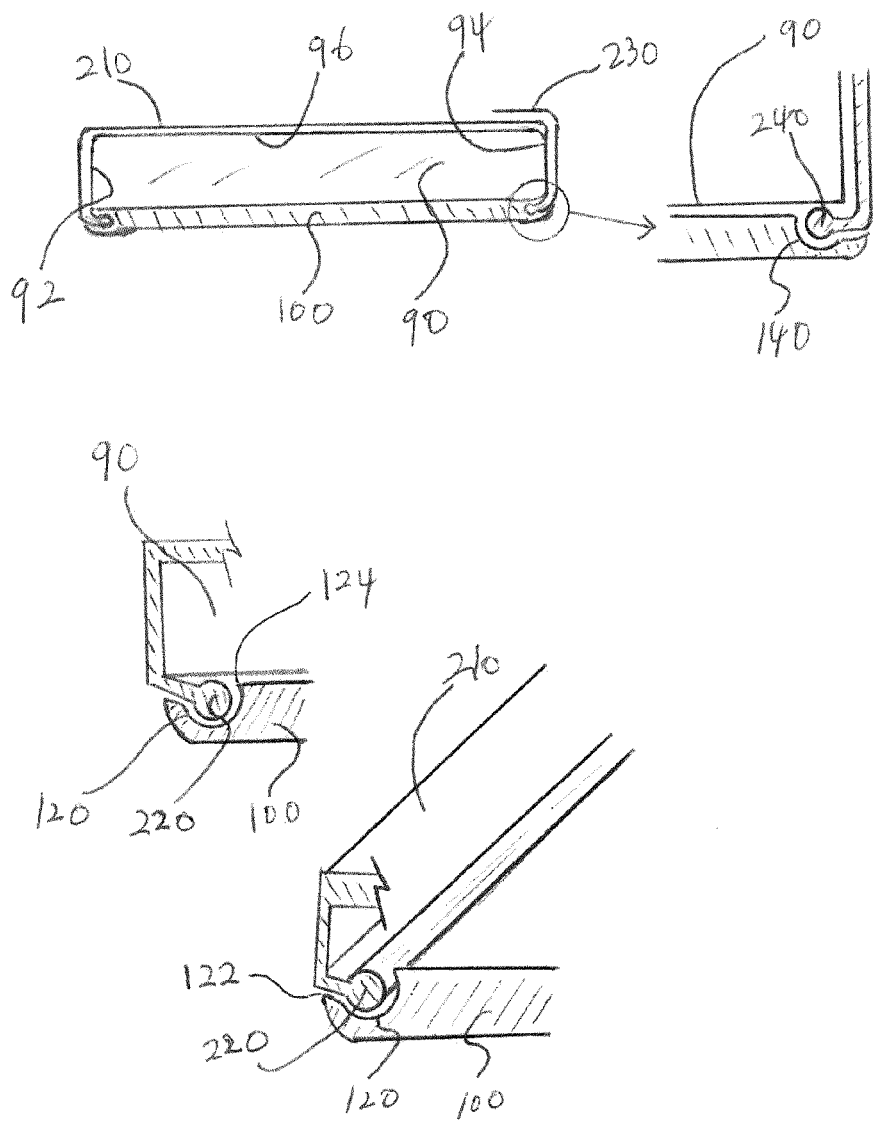
FIG. 3 is cross-sectional views of a first barrier rod and a first groove of a detachable front flip cover according to a first embodiment of the invention.

The first groove 120 may be provided along an inner edge portion of the main cell-phone case 100 so as to be received and held in place between the first groove 120 and a rear surface of the cell-phone 90 with the first side cover portion 214 sticking out from a gap between edges of the main cell-phone case 100 and the cell-phone 90 as shown in FIG. 3.

The first groove 120 may have a cross-sectional shape of a partial circle, and an arc portion corresponding to less than 180 degrees of which is opened toward the edge and top of the main cell-phone case 100 such that the first barrier rod 210 is inserted therethrough.

The edge 122 of the main cell-phone case 100 may be tilted by about 45 degrees as shown in FIG. 3.

A height of the edge 122 of the main cell-phone case 100 may be lower than a top inner surface 124 of the main cell-phone case 100 so as to make the gap between edges 122, 124 of the main cell-phone case 100 and the cell-phone 90 as shown in FIG. 3.

Figure 4:
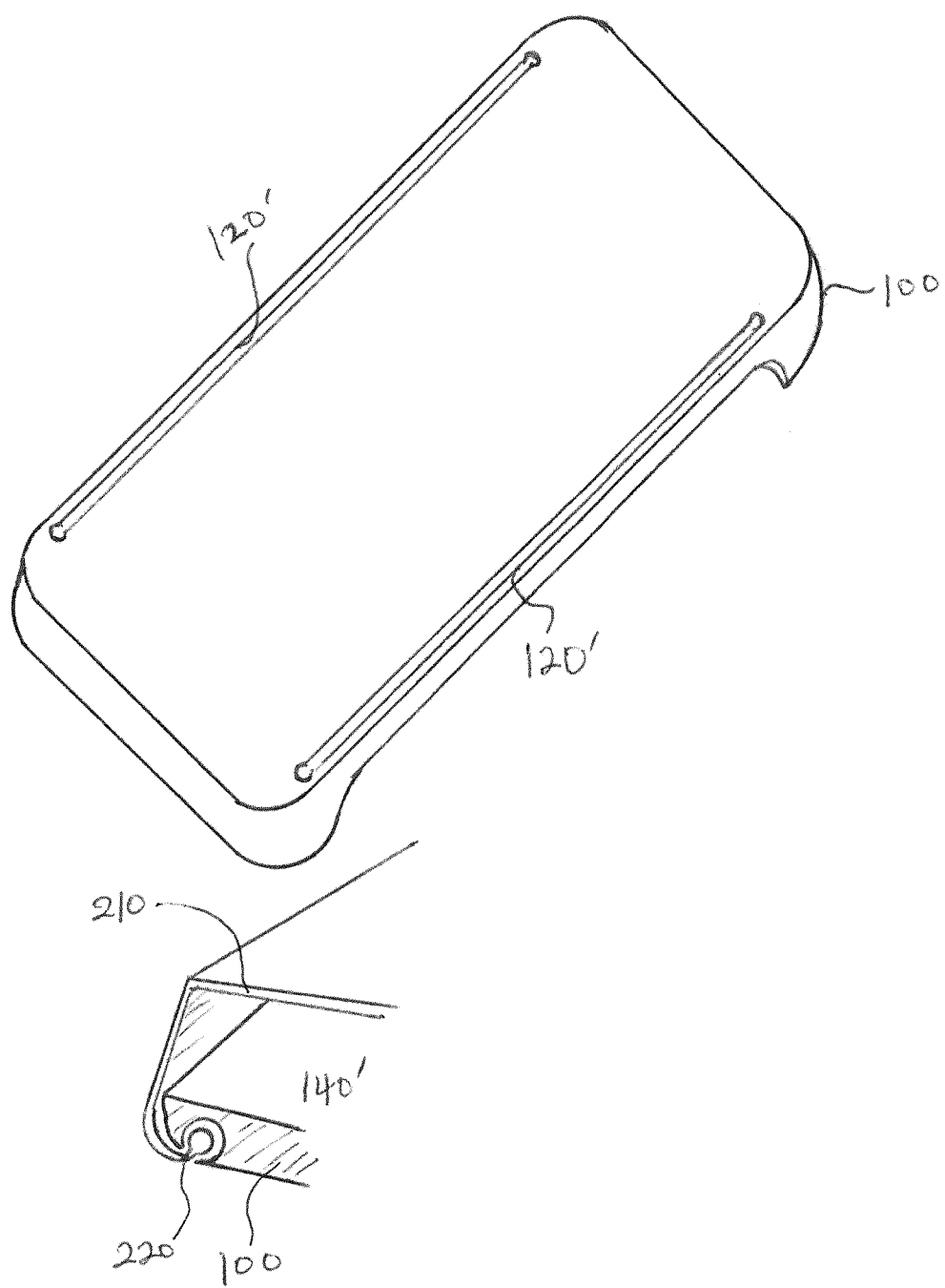
FIG. 4 is a cross-sectional view of a first barrier rod and a first groove of a detachable front flip cover according to a second embodiment of the invention.
Figure 5:
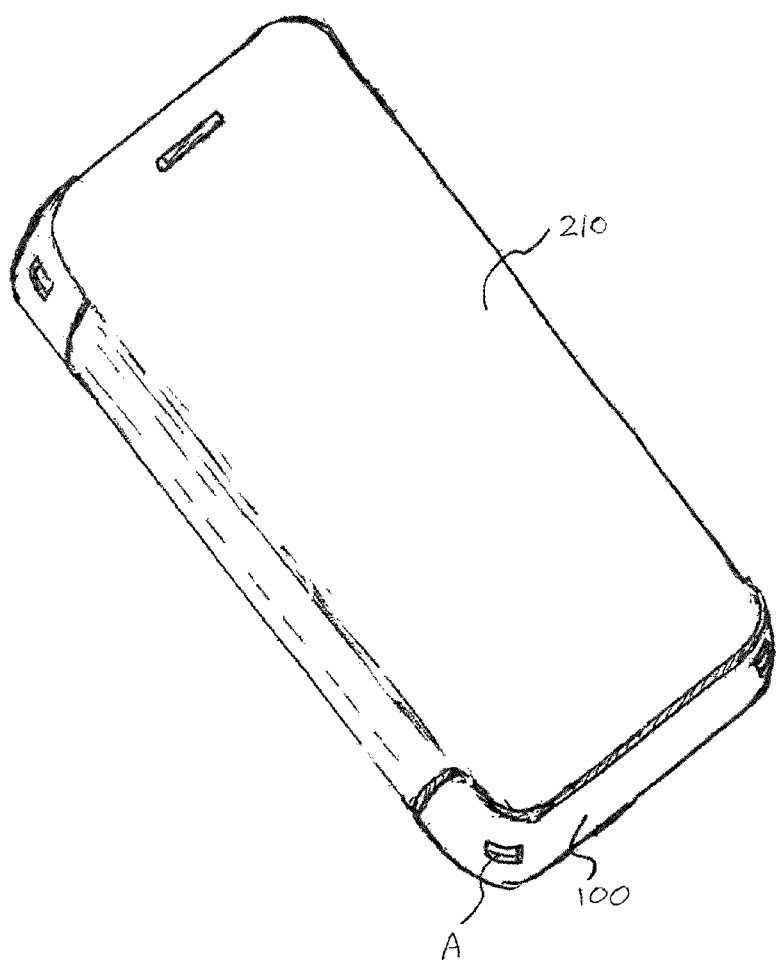
FIG. 5 is a perspective view showing a detachable front flip cover without a flip cover holder according to another embodiment of the invention.
Figure 6:
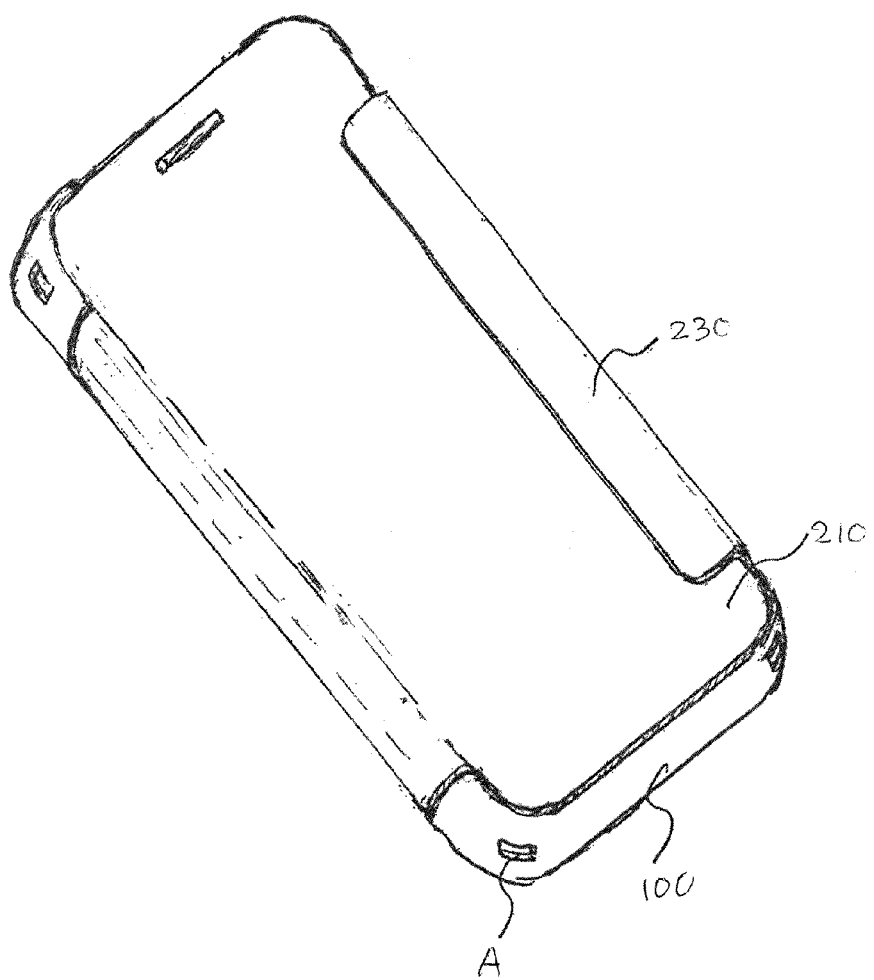
FIG. 6 is a perspective view showing a detachable front flip cover with a flip cover holder according to still another embodiment of the invention.

The first groove 120' may be provided along an outer edge portion of the main cell-phone case 100 so as to be received and held in place in the first groove 120 as shown in FIG. 4.

The first groove 120' may have a cross-sectional shape of a partial circle, and an arc portion corresponding to less than 180 degrees of which is opened toward a bottom of the main cell-phone case 100 such that the first barrier rod 210 is inserted therethrough, and a slit opening 218 formed by the arc portion is smaller than the diameter of the first barrier rod 210.

At least one of the first barrier rod 210 and the slit opening 218 may be resilient, such that they can engage each other detachably.

The one of the first barrier rod 210 and the slit opening 218 may be made of rubber.

The detachable front flip cover 200 may further comprise a flip cover holder 230 and a second barrier rod 240 as shown in FIG. 1.

The flip cover holder 230 is configured for holding the flip cover 210 in front of the cell-phone 90 and comprising a second edge portion 232, a second side cover portion 234 configured for covering a second side edge portion of the cell-phone, and a holding portion 236 configured for holding the flip cover 210 as shown in FIGS. 1-5.

The second barrier rod 240 is provided along the second edge portion 232, and the second side cover portion 234 extends from the second barrier rod 240, and the second barrier rod 240 has a diameter larger than a thickness of the second edge portion 234 of the flip cover holder 230, and the second barrier rod 240 is configured for being partially fitted into a second groove 140 provided along another edge portion of the main cell-phone case 100 so as to be received and held in place.

The second edge portion 232 and the second side cover portion 234 are connected to each other along a line foldably so as to fit still another corresponding edge of the cell-phone 90.

The second side cover portion 234 and the holding portion 236 are connected to each other along a line foldably so as to fit still another corresponding edge of the cell-phone 90.

The second groove 140 may be provided along an inner edge portion of the main cell-phone case 100 so as to be received and held in place between the second groove 140 and a rear surface of the cell-phone 90 with the second side cover portion 234 sticking out from a gap between edges of the main cell-phone case 100 and the cell-phone 90.

The second groove 140 may have a cross-sectional shape of a partial circle, an arc portion corresponding to less than 180 degrees of which is opened toward the edge and top of the main cell-phone case 100 such that the second barrier rod 240 is inserted therethrough.

The edge of the main cell-phone case 100 may be tilted by about 45 degrees.

As in the above, the height of the edge of the main cell-phone case 100 may be lower than a top inner surface of the main cell-phone case 100 so as to make the gap between edges of the main cell-phone case 100 and the cell-phone 90.

The flip cover 210 may further comprise a first fastener 211 provided at a edge of the front cover portion 216 and the flip cover holder 230 further comprises a second fastener 231.

One of the first and second fasteners 211, 231 may comprise a magnet and the other comprises a ferromagnetic material.

The second groove 140 may be provided along an outer edge portion of the main cell-phone case 100 so as to be received and held in place in the second groove 140.

The second groove 140 may have a cross-sectional shape of a partial circle, and an arc portion corresponding to less than 180 degrees of which is opened toward a bottom of the main cell-phone case 100 such that the second barrier rod 240 is inserted therethrough, and a slit opening like 218 formed by the arc portion is smaller than the diameter of the second barrier rod 240.

At least one of the second barrier rod 240 and the slit opening may be resilient.

The one of the second barrier rod 240 and the slit opening may be made of rubber.

Figure 7:
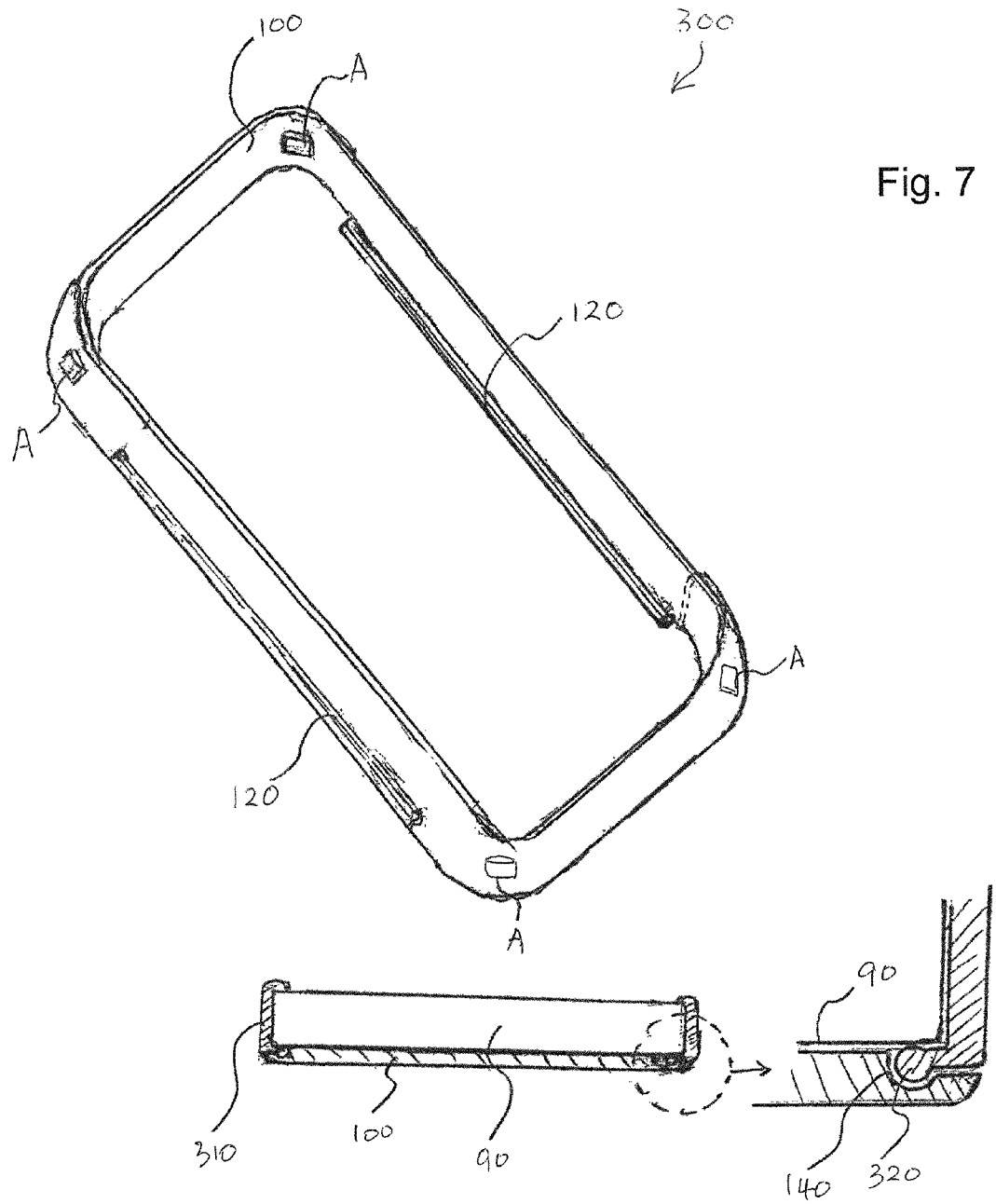
FIG. 7 is a perspective view and cross-sectional views showing an extra-protecting unit (TPU) according to still another embodiment of the invention.
Figure 8:
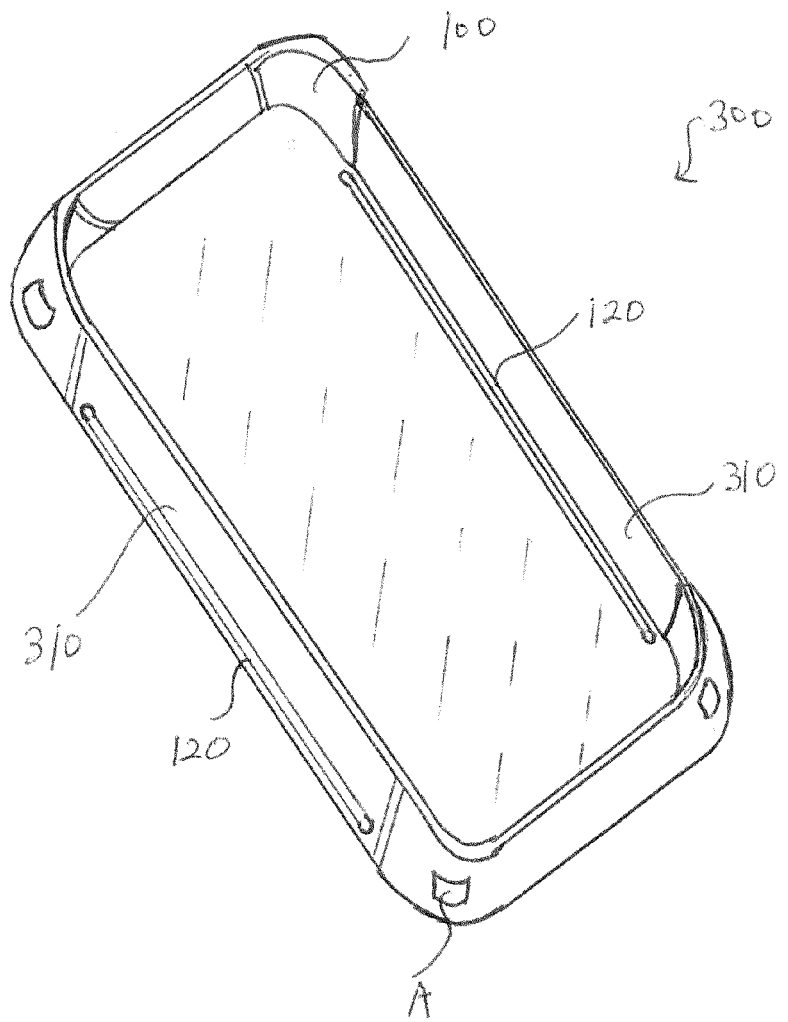
FIG. 8 is another perspective view showing an extra-protecting unit.
Figure 9:
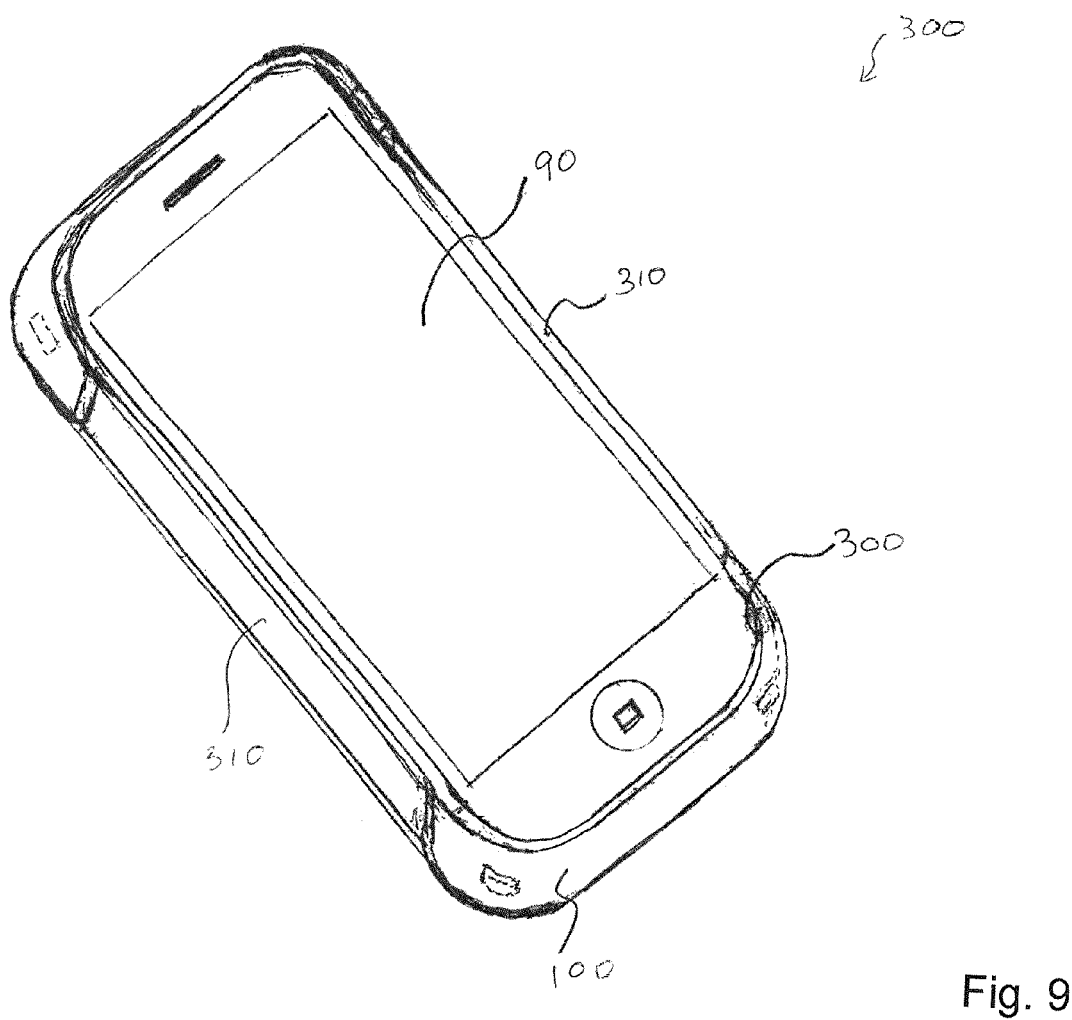
FIG. 9 is a perspective view showing an extra-protecting unit installed in a main cell-phone case along a cell-phone according to an embodiment of the invention.
Figure 10:
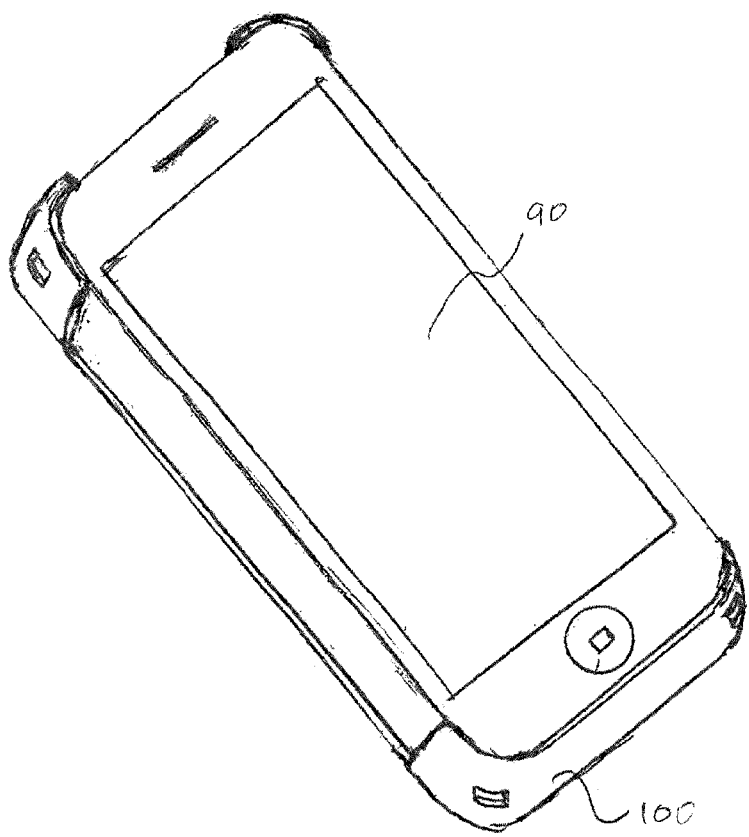
FIG. 10 is a perspective view showing a main cell-phone case installed in a cell-phone according without an extra-protecting unit.

In certain embodiments, the front cover portion 216 may be removed from the flip cover along with the holding portion 236 of the flip cover holder 230, resulting an extra-protecting unit (TPU) 300 having just the side cover portions 214, 234, which may be considered a side cover portion 310, as shown if FIGS. 7-9. Likewise, the corresponding barrier rods 220, 240 can be considered as a barrier rod 320 as in the previous embodiment.

Figure 11:
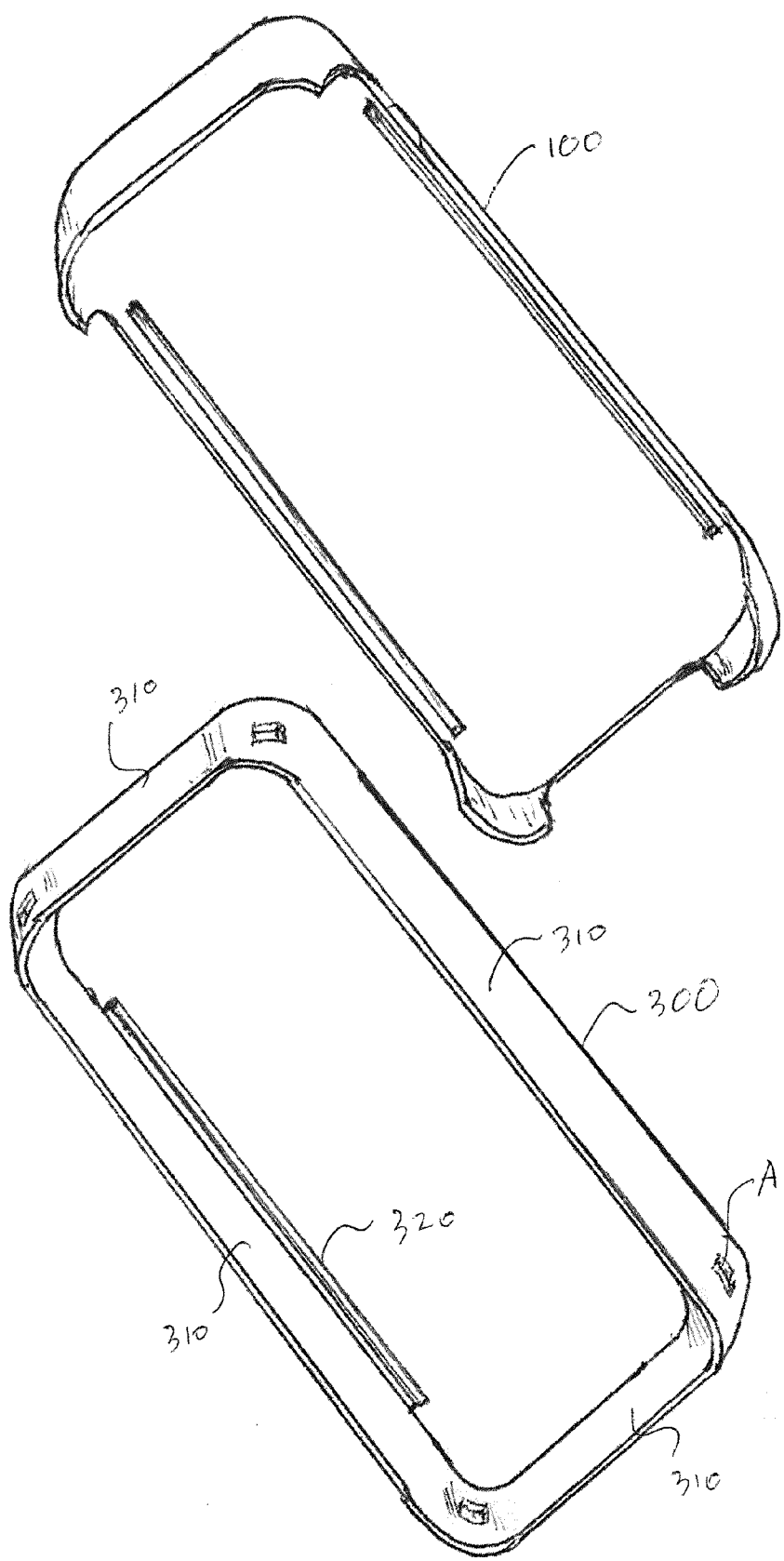
FIG. 11 is a perspective view showing an extra-protecting unit (TPU) plucked out of a main cell-phone case according to still another embodiment of the invention.

FIG. 11 shows a perspective view of an extra-protecting unit (TPU) 300 plucked out of a main cell-phone case 100 according to still another embodiment of the invention.

The TPU has four sides surrounding center hole therethrough, and may be made of elastic or resilient material such as rubber or silicon, which may be transparent.

In the illustrated embodiment, the main cell-phone case 100 may have a shape as shown, in which one side only is blocked. In certain embodiments, no side may be blocked. Of course, all four sides of the cell-phone case 100 may be blocked, too.

The size and dimensions of the TPU 300 may be made to be accommodated into the main cell-phone case 100. Still the ways and structures engaging the main cell-phone case 100 are same as the other embodiments.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A detachable front flip cover for main cell-phone case for protecting a cell-phone comprising:
    a flip cover configured for covering a front face of the cell-phone, wherein the flip cover comprises a first edge portion, a first side cover portion configured for covering a first side edge portion of the cell-phone, and a front cover portion configured for covering a front surface portion of the cell-phone; and
    a first barrier rod provided along the first edge of the flip cover, wherein the first side cover portion extends from the first barrier rod, wherein the first barrier rod has a diameter larger than a thickness of the first edge portion of the flip cover, wherein the first barrier rod is configured for being partially fitted into a first groove provided along an edge portion of the main cell-phone case so as to be received and held in place,
    wherein the first edge portion and the first side cover portion are connected to each other along a line foldably so as to fit a corresponding edge of the cell-phone,
    wherein the first side cover portion and the front cover portion are connected to each other along a line foldably so as to fit another corresponding edge of the cell-phone.

2. The detachable front flip cover of claim 1, wherein the first groove is provided along an inner edge portion of the main cell-phone case so as to be received and held in place between the first groove and a rear surface of the cell-phone with the first side cover portion sticking out from a gap between edges of the main cell-phone case and the cell-phone.

3. The detachable front flip cover of claim 2, wherein the first groove has a cross-sectional shape of a partial circle, and an arc portion corresponding to less than 180 degrees of which is opened toward the edge and top of the main cell-phone case such that the first barrier rod is inserted therethrough.

4. The detachable front flip cover of claim 3, wherein the edge of the main cell-phone case is tilted by about 45 degrees.

5. The detachable front flip cover of claim 3, wherein a height of the edge of the main cell-phone case is lower than a top inner surface of the main cell-phone case so as to make the gap between edges of the main cell-phone case and the cell-phone.

6. The detachable front flip cover of claim 1, wherein the first groove is provided along an outer edge portion of the main cell-phone case so as to be received and held in place in the first groove.

7. The detachable front flip cover of claim 6, wherein the first groove has a cross-sectional shape of a partial circle, and an arc portion corresponding to less than 180 degrees of which is opened toward a bottom of the main cell-phone case such that the first barrier rod is inserted therethrough, wherein a slit opening formed by the arc portion is smaller than the diameter of the first barrier rod.

8. The detachable front flip cover of claim 7, wherein at least one of the first barrier rod and the slit opening is resilient.

9. The detachable front flip cover of claim 8, wherein the one of the first barrier rod and the slit opening is made of rubber.

10. The detachable front flip cover of claim 1, further comprising:
    a flip cover holder configured for holding the flip cover in front of the cell-phone and comprising a second edge portion, a second side cover portion configured for covering a second side edge portion of the cell-phone, and a holding portion configured for holding the flip cover; and a second barrier rod provided along the second edge portion, wherein the second side cover portion extends from the second barrier rod, wherein the second barrier rod has a diameter larger than a thickness of the second edge portion of the flip cover holder, wherein the second barrier rod is configured for being partially fitted into a second groove provided along another edge portion of the main cell-phone case so as to be received and held in place, wherein the second edge portion and the second side cover portion are connected to each other along a line foldably so as to fit still another corresponding edge of the cell-phone, wherein the second side cover portion and the holding portion are connected to each other along a line foldably so as to fit still another corresponding edge of the cell-phone.

11. The detachable front flip cover of claim 10, wherein the second groove is provided along an inner edge portion of the main cell-phone case so as to be received and held in place between the second groove and a rear surface of the cell-phone with the second side cover portion sticking out from a gap between edges of the main cell-phone case and the cell-phone.

12. The detachable front flip cover of claim 11, wherein the second groove has a cross-sectional shape of a partial circle, an arc portion corresponding to less than 180 degrees of which is opened toward the edge and top of the main cell-phone case such that the second barrier rod is inserted therethrough.

13. The detachable front flip cover of claim 11, wherein the edge of the main cell-phone case is tilted by about 45 degrees.

14. The detachable front flip cover of claim 11, wherein a height of the edge of the main cell-phone case is lower than a top inner surface of the main cell-phone case so as to make the gap between edges of the main cell-phone case and the cell-phone.

15. The detachable front flip cover of claim 11, wherein the flip cover further comprises a first faster provided at a edge of the front cover portion and the flip cover holder further comprises a second faster.

16. The detachable front flip cover of claim 15, wherein one of the first and second fasteners comprises a magnet and the other comprises a ferromagnetic material.

17. The detachable front flip cover of claim 10, wherein the second groove is provided along an outer edge portion of the main cell-phone case so as to be received and held in place in the second groove.

18. The detachable front flip cover of claim 17, wherein the second groove has a cross-sectional shape of a partial circle, and an arc portion corresponding to less than 180 degrees of which is opened toward a bottom of the main cell-phone case such that the second barrier rod is inserted therethrough, wherein a slit opening formed by the arc portion is smaller than the diameter of the second barrier rod.

19. The detachable front flip cover of claim 18, wherein at least one of the second barrier rod and the slit opening is resilient.

20. The detachable front flip cover of claim 18, wherein the one of the second barrier rod and the slit opening is made of rubber.

* * * * *